UNITED STATES PATENT OFFICE.

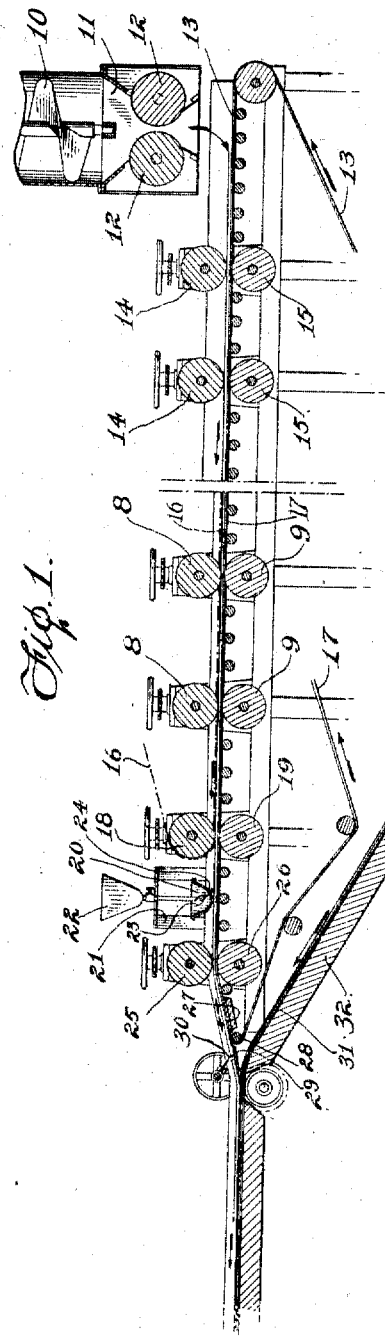
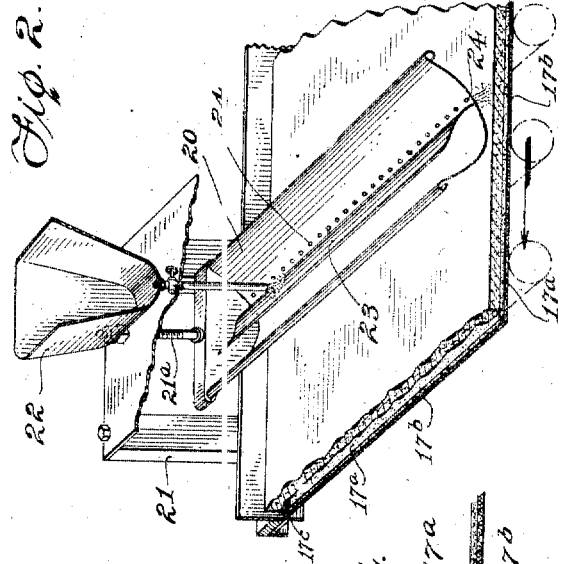
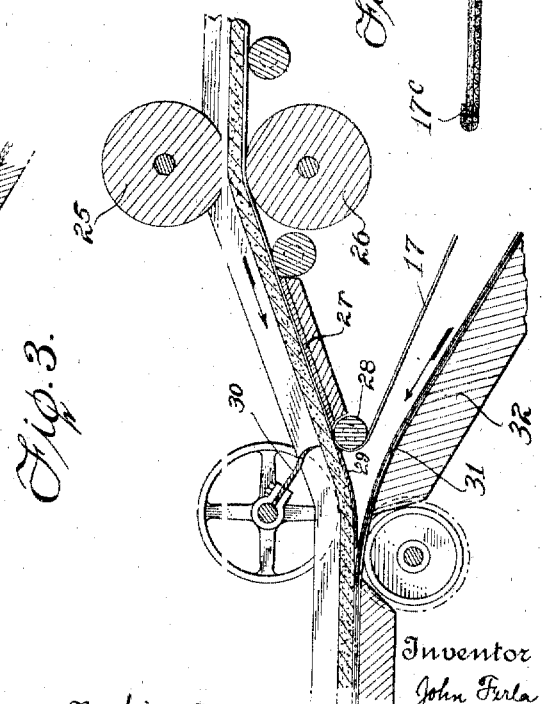

JOHN FERLA, OF POUGHKEEPSIE, NEW YORK.

APPARATUS FOR MANUFACTURING COMPOSITION BOARD.

1,219,448.

Specification of Letters Patent. Patented Mar. 20, 1917.

Application filed May 6, 1916. Serial No. 95,900.

*To all whom it may concern:*

Be it known that I, JOHN FERLA, a citizen of the United States, and a resident of Poughkeepsie, in the county of Dutchess and State of New York, have invented certain new and useful Improvements in Apparatus for Manufacturing Composition Board, of which the following is a specification.

This invention relates to apparatus for manufacturing composition board, particularly to apparatus, such as described in my prior application Ser. No. 709,438, filed July 15, 1912, for making plastic composition board of a plastic containing a comparatively small percentage of moisture.

The main object of the present invention is to improve the machine described in my prior application and to improve the working thereof so as to obtain from the plastic material a smooth sheet which travels along without sticking and easily passes off the belt on to the metal carrying plate.

The various further objects will more fully appear from the detailed description and the features of novelty will be particularly pointed out in the claims.

In the drawings illustrating the invention,

Figure 1 is a diagrammatic fragmental sectional elevation of the improved apparatus.

Fig. 2 is an enlarged fragmental detail view illustrating in perspective the trowel device.

Fig. 3 is an enlarged sectional detail view of the bridging device for passing the material from the felt belt to the cut-off plate.

Fig. 4 is an enlarged sectional detail view of the reinforced felt belt.

Referring in detail to the drawings, the plastic material is fed by a suitable feed device such as a screw 10 to a hopper 11 and is discharged by the oppositely rotating feed rolls 12 upon a canvas conveyer belt 13. The material is carried by the conveyer through successive pairs of gage rollers 14, 15 which gage the sheet down approximately to the desired thickness. From the canvas belt, the sheet of material passes between two felt conveyer belts 16, 17 between which the plastic sheet of material is compressed and tamped down by successive pairs of pressure rolls 8 and 9. The felt belts are washed and cleaned during their return travel as will be understood by reference to the former application above mentioned. The felt belts may absorb moisture from the top and bottom of the material or impart a certain amount of moisture thereto which can be regulated by wringing the felt belts more or less during the return travel, as will be readily understood. All the pressure rolls are positively driven to properly gage and tamp the comparatively stiff plastic. The construction described so far is substantially identical with the apparatus in my former application above referred to.

I will now describe the improvements whereby the operation of the apparatus is improved to insure the proper movement of the sheet of material and to obtain a sheet which has a smooth finished appearance. The lower felt belt 17 is kept stretched taut to form a flat continuous carrier for the sheet and avoiding any wrinkling. To strengthen the belt so that tension can be applied thereto, the felt portion 17$^a$ (Fig. 4) is provided with a backing 17$^b$ of stronger material such as canvas or the like which, however, has a comparatively lower absorptive capacity than the felt. This backing is turned over at the edges 17$^c$ to impart additional strength to the felt at the edges.

Beyond the last pair of pressure rollers 18, 19 engaging both the upper and lower belts, the lower belt 17 continues while the upper belt starts on its return run. This leaves the upper surface of the sheet of material exposed to be engaged directly by the succeeding upper feed rolls, and to prevent adherence of the material thereto and at the same time smooth out the surface of the sheet I provide a combined oiling and trowel device as follows:

A curved bottom trough member 20 is adjustably mounted in standards 21, and oil is fed thereto from a reservoir 22 mounted thereabove. Preferably, a baffle plate 23 extends through the trough and forms a compartment into which the oil drops and from thence is discharged through apertures 24 to a point at the rear of the trowel. Thus the material as it approaches the curved bottom trough is previously oiled, and as it passes under this curved bottom, the oil is uniformly spread and the sheet is smoothed out without adhering to the surface of the trowel, and the succeeding pressure rollers. By manipulating the adjusting nuts on the screw rods 21ª, the vertical height of the trowel is adjusted in accordance with the thickness of the material.

After passing the trowel, the oiled and smoothed sheet passes through the final pair of pressure rollers 25, 26 particularly used for embossing, corrugating or scoring the sheet, then over a metal bridging plate 27, lying closely adjacent the crest of the small end roller 28, and then on to the cut-off plate 29 on which the cut-off knife 30 works to sever the sheet and leave it on a metal plate 31. The latter is fed up an inclined guideway 32 in position to receive the severed portions of the continuous sheet. It will be noted that the end roller 28 is the roller around which the belt 17 passes on its return travel and is of such small diameter that it is possible for the plate 29 to lie in close proximity of the crest thereof, and thus the plate in a sense cleaves the material off the belt overcoming the adhesion of the material to the belt. Furthermore, by reason of having a small roller of sharp curvature, sticking of the material is further reduced, as the sharp curvature forms a larger cleavage angle which affords a mechanical advantage in separating the adhering surfaces. Also, the small roller permits the guide 32 to come up at a smaller angle and thus the steel plate does not have to be bent to such an extent as when large roller is used. This reduces friction.

Having thus described my invention, I claim as new and desire to secure by Letters Patent:

1. In apparatus for making plastic composition board, a traveling belt of absorbent material for carrying said sheet of plastic, said belt being provided with a reinforcing backing of a strong flexible material having a comparatively lower absorptive capacity than the body of the belt and stretched taut to present a flat surface for the plastic sheet, an upper belt of absorbent material, and tamping rolls in pairs above and below the belts.

2. In apparatus for making plastic composition board, a traveling belt of absorbent material for carrying said sheet of plastic, said belt being provided with a reinforcing backing and stretched taut to present a flat surface for the plastic sheet, an upper belt of absorbent material, tamping rolls in pairs above and below the belts, the lower belt extending past the upper belt, a roll of comparatively small diameter around which the lower belt turns to start its return travel, a bridging plate below the lower belt extending adjacent the crest of the small roll, and a second plate on the other side of the small roll extending to a point closely adjacent the crest of the roll whereby the sheet of plastic is transferred from the belt to the second plate.

3. In apparatus for making plastic composition board, a traveling belt of absorbent material for carrying said sheet of plastic, said belt being provided with a reinforcing backing and stretched taut to present a flat surface for the plastic sheet, an upper belt of absorbent material, tamping rolls in pairs above and below the belts, the lower belt extending beyond the upper belt, pressure rolls beyond said upper belt, the upper feed roll directly engaging the sheet of plastic, an oiling device disposed rearwardly of said pressure rolls, a roll of comparatively small diameter around which the lower belt turns to start its return travel, a bridging plate below the lower belt extending adjacent the crest of the small roll, and a second plate on the other side of the small roll extending to a point closely adjacent the crest of the roll whereby the sheet of plastic is transferred from the belt to the second plate.

4. In apparatus for making plastic composition board, a traveling belt of absorbent material for carrying said sheet of plastic, said belt being provided with a reinforcing backing and stretched taut to present a flat surface for the plastic sheet, an upper belt of absorbent material, tamping rolls in pairs above and below the belts, the lower belt extending beyond the upper belt, an oiling and trowel device disposed over said extension, a roll of comparatively small diameter around which the lower belt turns to start its return travel, a bridging plate below the lower belt extending adjacent the crest of the small roll, and a second plate on the other side of the small roll, extending to a point closely adjacent the crest of the roll whereby the sheet of plastic is transferred from the belt to the second plate.

5. In apparatus for making plastic composition board, a traveling belt of absorbent material for carrying said sheet of plastic, a second belt of absorbent material above the first mentioned belt, tamping rolls in pairs above and below the belts, the lower belt extending beyond the upper belt, pressure rolls engaging the sheet of material and the lower belt at said extension for transferring the sheet of plastic to a cut-off plate, and an oiling device disposed rearwardly of said pressure rolls to prevent adherence of the material thereto.

6. In apparatus for making plastic composition board, a traveling belt of absorbent material for carrying said sheet of plastic, a second belt of absorbent material above the first mentioned belt, tamping rolls in pairs above and below the belts, the lower belt extending beyond the upper belt, pressure rolls engaging the sheet of material and the lower belt at said extension for transferring the sheet of plastic to a cut-off plate, and an oiling and trowel device disposed rearwardly of said pressure rolls to prevent adherence of the material thereto.

7. In apparatus for making plastic composition board, a traveling felt belt for carrying the sheet of plastic, said belt being provided with a canvas backing turned over the edges to reinforce the belt, the belt being stretched taut to present a flat surface for the plastic sheet, an upper felt belt, and tamping rolls in pairs above and below the belts.

8. In apparatus for making plastic composition board, comprising a pair of traveling belts between which the sheet of plastic material is compressed and by which it is fed, the lower belt extending beyond the upper belt, a trowel device disposed over said extension, said trowel device comprising a trough having a rounded bottom, and means for applying a lubricant fluid on the surface of the sheet of plastic rearwardly of the trowel device to prevent adherence of the plastic thereto.

9. In apparatus for making plastic composition board comprising a pair of traveling belts between which the sheet of plastic material is compressed and by which it is fed, the lower belt extending beyond the upper belt, a trowel device disposed over said extension, said trowel comprising a trough formed with a plurality of apertures at the rear wall thereof, and means for supplying a lubricant to the trough to be discharged through said apertures on the sheet of plastic.

10. In apparatus for making plastic composition board, a traveling belt for carrying the sheet of plastic, an end roll of comparatively small diameter around which the belt turns to start its return travel, an inclined guide device below the return run of the belt closely adjacent to said roll forming a comparatively small angle with the traveling belt, said guide serving to feed a carrying belt for the sheet of plastic after it is cut off.

11. In apparatus for making plastic composition board, a traveling belt for carrying the sheet of plastic, an end roll of comparatively small diameter around which the belt turns to start its return travel, a cut-off plate extending closely adjacent the crest of the roll, an inclined guide device below the return run of the belt closely adjacent to said roll forming a comparatively small angle with the traveling belt, said guide serving to feed a carrying belt for the sheet of plastic after it is cut off.

Signed at New York city, in the county of New York, and State of New York, this 25th day of January A. D. 1916.

JOHN FERLA.

Witnesses:
A. T. SCHARFS,
NATHAN COHEN.